(12) United States Patent
Lifsches

(10) Patent No.: US 10,803,141 B2
(45) Date of Patent: Oct. 13, 2020

(54) IN-MEMORY STOCHASTIC ROUNDER

(71) Applicant: GSI Technology Inc., Sunnyvale, CA (US)

(72) Inventor: Samuel Lifsches, Tel Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 96 days.

(21) Appl. No.: 16/027,381

(22) Filed: Jul. 5, 2018

(65) Prior Publication Data

US 2020/0012708 A1 Jan. 9, 2020

(51) Int. Cl.
*G06F 17/18* (2006.01)
*G06F 5/01* (2006.01)
*G06F 7/58* (2006.01)

(52) U.S. Cl.
CPC ............. *G06F 17/18* (2013.01); *G06F 5/01* (2013.01); *G06F 7/588* (2013.01)

(58) Field of Classification Search
None
See application file for complete search history.

(56) References Cited

U.S. PATENT DOCUMENTS

| 6,104,968 | A | * | 8/2000 | Ananth | G06F 7/602 323/283 |
|---|---|---|---|---|---|
| 8,238,173 | B2 | | 8/2012 | Akerib et al. | |
| 9,418,719 | B2 | | 8/2016 | Akerib et al. | |
| 2018/0157621 | A1 | | 6/2018 | Shu et al. | |
| 2018/0315398 | A1 | * | 11/2018 | Kaul | G06F 9/30036 |

OTHER PUBLICATIONS

Survey of Stochastic Computing by A. Alaghi and J.P. Hayes, ACM Transactions on Embedded Computing Systems, vol. 12, No. 2s, Article 92, May 2013.

* cited by examiner

*Primary Examiner* — Michael D. Yaary
(74) *Attorney, Agent, or Firm* — Heidi Brun Associates Ltd.

(57) ABSTRACT

An associative processor includes a memory array and a controller. The memory array stores a multiplicity of N bit stochastic numbers in separate rows of a stochastic section of the memory array and each stochastic number has a same probability distribution P. The controller includes a probability calculator which receives a desired probability distribution $P_{desired}$, determines a Boolean function of a set of the N bit stochastic numbers which produces the probability distribution $P_{desired}$ and activates associated rows of the stochastic numbers to implement the function on the rows to produce a resultant stochastic number having the probability distribution $P_{desired}$.

28 Claims, 4 Drawing Sheets

IN-MEMORY STOCHASTIC ROUNDER

FIELD OF THE INVENTION

The present invention relates to associative processing generally and to stochastic rounding within an associative processor in particular.

BACKGROUND OF THE INVENTION

Stochastic computing is known in the art and is discussed in the survey article, "Survey of Stochastic Computing" by A. Alaghi and J. P. Hayes, *ACM Transactions on Embedded Computing Systems*, Vol. 12, No. 2s, Article 92, May 2013.

Stochastic numbers are represented as 0-1 bitstreams that denote real numbers in the interval [0,1]. A bitstream Z (of any length) denotes a number p that is the ratio between the number of 1s in Z and the length of Z. For example, both Z_0=(1,0,0,0) and Z_1=(0,0,1,0,0,1,0,0) represent the number p=0.25.

As shown in FIG. 1, to which reference is now made, a stochastic number generator 10, that is, a circuit that converts a binary number p to a stochastic number Z, may comprise a random (or pseudo-random) number generator 12 and a comparator 14, receiving the binary number p and the output of random number generator 12. Stochastic number generator 10 may operate for M clock cycles, where M is the length or "precision" of the generated stochastic binary number Z.

At an ith cycle of the M cycles, comparator 12 produces the ith bit for stochastic number Z as a function of the number p and a current random number $R_i$ generated by random number generator 12. Comparator 12 produces a 1 when $R_i$ is less than p and a 0 otherwise.

FIG. 1 also shows a stochastic converter 20 which may convert the stochastic number Z to a binary number p. Stochastic converter 20 comprises a counter 16 and a converter 18. Counter 16 counts the number of 1s in stochastic number Z. Converter 18 then determines number p as the ratio of the number of 1s to the total number of bits in Z.

Because stochastic numbers Z are bitstreams, computations on them are very simple, bit-wise binary operations, such as AND, OR, or combinations thereof. This makes stochastic computing attractive. A full discussion of stochastic computing may be found at https://en.wikipedia.org/wiki/Stochastic_computing.

Stochastic computing typically represents an M bit, binary number p as a probability value Z. As the precision of number p is increased, significantly more bits are needed for the associated stochastic number Z. However, stochastic computing can provide "progressive precision", i.e. the precision increases as a computation proceeds from the most significant bit to the least significant bit of binary number p.

Stochastic rounding is used to reduce the precision of the binary numbers, usually from one standard precision to a lower precision, e.g. from a 32-bit number to a 16-bit number. In stochastic rounding, the decision to round up or down is based on the probability represented by the portion of the word not to be included in the number. For example, in the non-binary numbers, the number 102.34 can be rounded to 102 with a probability of (1-.34) (e.g. P(rounded=102)=0.66) or 103 with a probability of 0.34 (e.g. P(rounded=103)=0.34). In another example, the number 102.34 can be rounded to 102.3 with a probability of 0.6 or to 102.4 with a probability of 0.4. Note that it is not a biased rounding—sometimes it will round up and sometimes it will round down.

As shown in FIG. 2, to which reference is now briefly made, any word or binary number whose precision is being reduced (i.e. is being rounded), may be divided into two sections, where the portion of the word being kept is known as the MSB (most significant bit) and the portion of the word being removed is the LSB (least significant bit). A stochastic rounder 22 may take the LSB bits, determine its associated probability and use the associated probability to determine if to round up or to round down.

SUMMARY OF THE PRESENT INVENTION

There is therefore provided, in accordance with a preferred embodiment of the present invention, a method for generating probability distributions. The method includes creating a multiplicity of stochastic numbers, each stochastic number having a same probability distribution P, receiving a desired probability distribution $P_{desired}$, and determining a Boolean function of a set of the stochastic numbers which produces a probability distribution $P_{desired}$ related to the desired probability distribution.

Moreover, in accordance with a preferred embodiment of the present invention, the stochastic numbers have a length N, where N is a number of binary numbers to be rounded.

Further, in accordance with a preferred embodiment of the present invention, the same probability distribution P is 0.5.

Additionally, in accordance with a preferred embodiment of the present invention, the determining includes re-using the stochastic numbers for different functions.

Further, in accordance with a preferred embodiment of the present invention, the method includes shifting bits within the stochastic numbers to generate new versions of the stochastic numbers.

Still further, in accordance with a preferred embodiment of the present invention, the method includes regenerating the multiplicity of the stochastic numbers after performing a predefined number of determining operations.

There is also provided, in accordance with a preferred embodiment of the present invention, a method for stochastic rounding of binary numbers. The method includes having a multiplicity N of binary words to be rounded, where each binary word has a most significant section to be maintained and a least significant section to be removed. The method also includes having a plurality of stochastic numbers of length N, each having a same probability distribution P. The method also includes receiving a portion of at least one of the least significant sections, implementing a Boolean function of a set of the stochastic numbers which produces a stochastic number with a probability distribution $P_{portion}$ related to the portion, and for each word having the portion, incrementing the most significant number by an associated bit of the resultant stochastic number.

Moreover, in accordance with a preferred embodiment of the present invention, the determining includes generating a multiplicity of the N bit, stochastic numbers using a random number generator and selecting the set from the multiplicity.

Further, in accordance with a preferred embodiment of the present invention, the determining includes re-using the multiplicity of the N bit, stochastic numbers for different functions.

Still further, in accordance with a preferred embodiment of the present invention, the method also includes regenerating the multiplicity of N bit, stochastic numbers after performing a predefined number of implementing operations.

Moreover, in accordance with a preferred embodiment of the present invention, the multiplicity N of binary words and the N bit, stochastic numbers are stored in a memory array and the receiving, determining, implementing and adding operations occur within the memory array.

Additionally, in accordance with a preferred embodiment of the present invention, N is over 10,000, the portion is less than 5 bits and the multiplicity is 25 or less.

Further, in accordance with a preferred embodiment of the present invention, the portion is from bits following a last bit of the significant section of a selected word.

There is also provided, in accordance with a preferred embodiment of the present invention, an associative processor including a memory array and a controller. The memory array stores a multiplicity of N bit stochastic numbers in separate rows of a stochastic section of the memory array and each stochastic number has a same probability distribution P. The controller includes a probability calculator which receives a desired probability distribution Pdesired, determines a Boolean function of a set of the N bit stochastic numbers which produces the probability distribution Pdesired and activates associated rows of the stochastic numbers to implement the function on the rows to produce a resultant stochastic number having the probability distribution Pdesired.

Further, in accordance with a preferred embodiment of the present invention, the same probability distribution P is 0.5.

Still further, in accordance with a preferred embodiment of the present invention, the controller includes a row rotator to re-use the stochastic numbers for different functions.

Moreover, in accordance with a preferred embodiment of the present invention, the controller comprises a shifter to shift bits within the stochastic numbers to generate new versions of the stochastic numbers. The controller also regenerates the multiplicity of the stochastic numbers a predefined number of probability calculations.

There is also provided, in accordance with a preferred embodiment of the present invention, an associative processor including a memory array and a controller. The memory array stores a multiplicity N of binary words to be rounded in a data section, each word stored in a different column of the data section, and stores a multiplicity of N bit stochastic numbers in separate rows of a stochastic section of the memory array. Columns of the data section and columns of the stochastic section are aligned. Each stochastic number has a same probability distribution P, and each binary word has a most significant section to be maintained and a least significant section to be removed. The controller includes a probability calculator, a column matcher and an adder. The probability calculator which receives a portion of at least one of the least significant sections, determines a Boolean function of a set of the stochastic numbers which produces a probability distribution $P_{portion}$ related to the portion and activates associated rows of the stochastic numbers to implement the function on the rows to produce a resultant stochastic number having the probability distribution $P_{portion}$. The column matcher identifies columns of the multiplicity of words with the portion, and the adder adds an associated bit of the resultant stochastic number in the identified column to its associated column.

Moreover, in accordance with a preferred embodiment of the present invention, the controller includes a random number generator to generate the multiplicity of N bit, stochastic numbers.

Further, in accordance with a preferred embodiment of the present invention, the controller includes a row rotator to rotate the multiplicity of N bit, stochastic numbers into different rows.

Still further, in accordance with a preferred embodiment of the present invention, the row rotator includes a bit shifter to shift bits within the N bit, stochastic numbers to generate new versions of the N bit, stochastic numbers.

Additionally, in accordance with a preferred embodiment of the present invention, the controller reactivates the random number generator after a predefined number of calculation cycles of the adder.

Further, in accordance with a preferred embodiment of the present invention, the same probability distribution is 0.5.

Still further, in accordance with a preferred embodiment of the present invention, N is over 10,000, the portion is less than 5 bits and the multiplicity is 25 or less.

Finally, there is provided, in accordance with a preferred embodiment of the present invention, a method for stochastic rounding of binary numbers. The method includes having a multiplicity N of binary words to be rounded, where each binary word has a most significant section to be maintained and a least significant section to be removed. The method also includes having a plurality of stochastic numbers $S_y$ of length N, each having a probability distribution $P_y$. The method further includes having K probabilities $p_k$, all in the span of the stochastic numbers $S_y$, and having Q markers $m_q$, each indicating one set of numbers that have a certain LSB. The method also includes generating a stochastic number $S_{gen}$ of length N such that each sub-sequence $SS_q$, which is defined by stochastic number $S_{gen}$ marked by marker $m_q$, is a stochastic number that denotes a probability $p_k$ associated with each sub-sequence $SS_q$.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
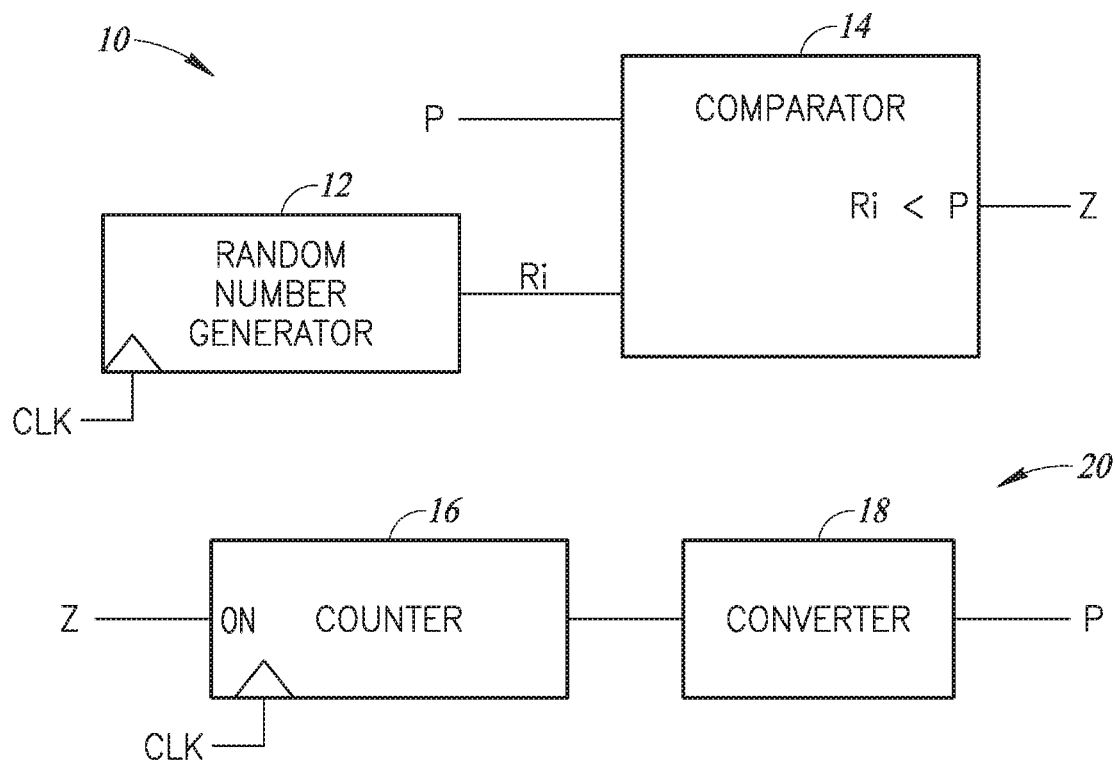
FIG. 1 is a block diagram illustration of a prior art stochastic number generator and a prior art stochastic converter.
Figure 2:
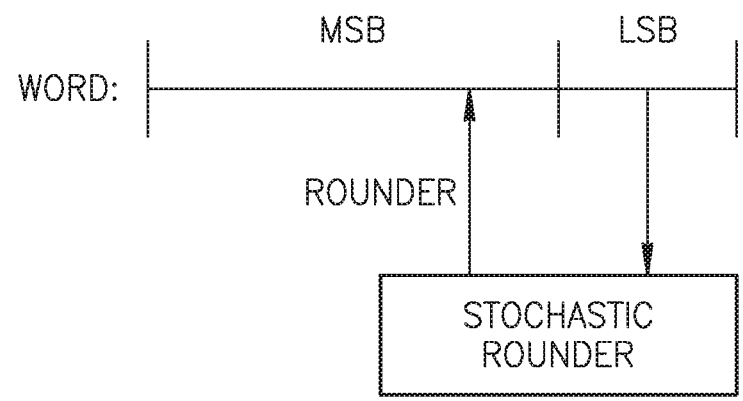
FIG. 2 is a prior art illustration of the operation of a stochastic rounder.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that stochastic rounding requires generating probability distributions associated with the lowest significant bit (LSB) of each number to be rounded, a generally computationally-intensive process and particularly intensive when a large plurality of numbers is to be rounded at once.

Applicant has further realized that, given a sequence of length N of standard precision numbers {Si} to be rounded to direction d, a stochastic number Z of length greater than or equal to N may be used to perform stochastic rounding as follows:

if Z[i]=1, then Si is rounded to direction d,
otherwise, Si is rounded to the other direction.

Alternatively, a stochastic number Z1 may be utilized to round Si to direction d if and only if Z1[i]=0.

The example above exemplifies the relationship between stochastic numbers and stochastic rounding and shows how a plurality of numbers may be generally simultaneously stochastically rounded with a single stochastic number Z or Z1. Applicant has further realized that associative processors perform in-memory calculations in parallel and can generate probability distribution simulations to be used for a large plurality of numbers at one time, making the operation much simpler and much more cost-effective.

Figure 3:
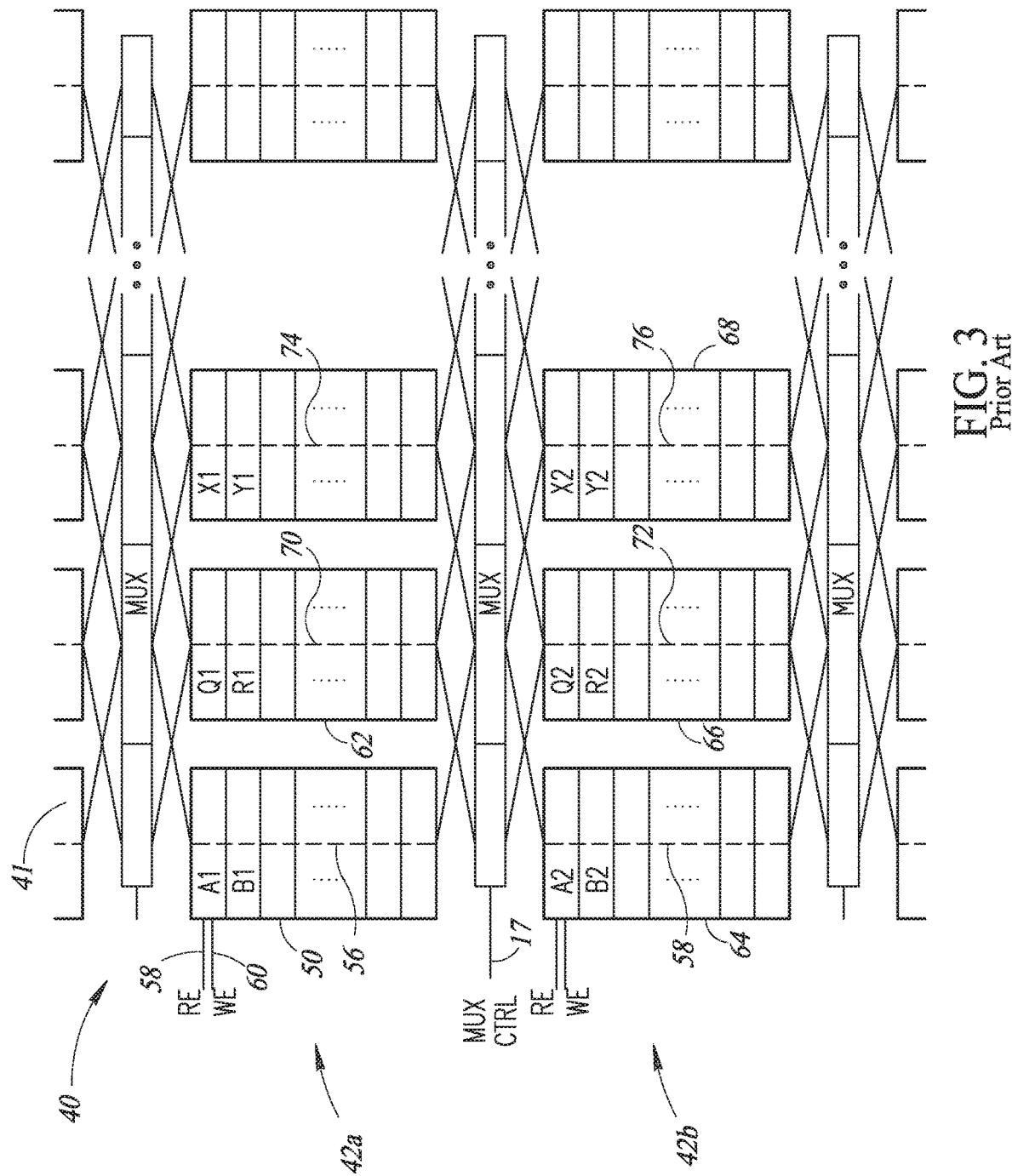
FIG. 3 is a schematic illustration of a prior art associative processor, useful in understanding the operation of the present invention.

FIG. 3, to which reference is now made, describes an associative processor 40, implemented in a memory array 41. Associative processor 40 may be implemented in accordance with the teachings of U.S. Pat. No. 9,418,719, assigned to the common assignee of the present invention and incorporated herein by reference.

Briefly, associative processor 40 may be formed of a plurality of bit line processors 13, each processing one bit of a word and each word being stored in a column of memory array 41. Thus, each column of memory array 41 may implement multiple bit line processors 13. FIG. 3 shows a portion of memory array 41 where 6 exemplary 2-bit words are to be processed, A, B, Q, R, X and Y. Bits A1 and B1 may be stored in bit line processor 42A, along bit line 56 while bits A2 and B2 may be stored in section 42B along bit line 58. Bits Q1 and R1 may be stored in bit line processor 42A along bit line 70 while bits Q2 and R2 may be stored in bit line processor 42B along bit line 72. Bits X1 and y1 may be stored in bit line processor 42A along bit line 74 while bits X2 and Y2 may be stored in bit line processor 42B along bit line 76.

Typically, for an M bit word, there may be M sections, each storing a different bit of the word. Each section may have a significant number N, such as 2048, of bit lines and thus, of bit line processors. Each section may provide a row of bit line processors. Thus, N M-bit words may be processed in parallel, where each bit may be processed by separate bit line processors, in parallel.

A typical cell column, such as cell column 50, may store the input data to be processed in the first few cells of the column. In FIG. 3, the bits of words A, Q and X are stored in the first cells of the columns while the bits of words B, R and Y are stored in the second cells of the columns. The remaining cells in each column (there may be 20-30 cells in a column) may be left as temporary storage for use during the processing operation.

Multiplexers 17 may connect the rows of bit line processors and a row decoder (not shown) and may activate the appropriate cells in each bit line processor. As described hereinabove, a row of cells in the memory array are connected by word lines and thus, the decoder may activate the relevant word lines of cells of bit line processors for reading and the relevant word line in a different set of bit line processors for writing.

Figure 4:
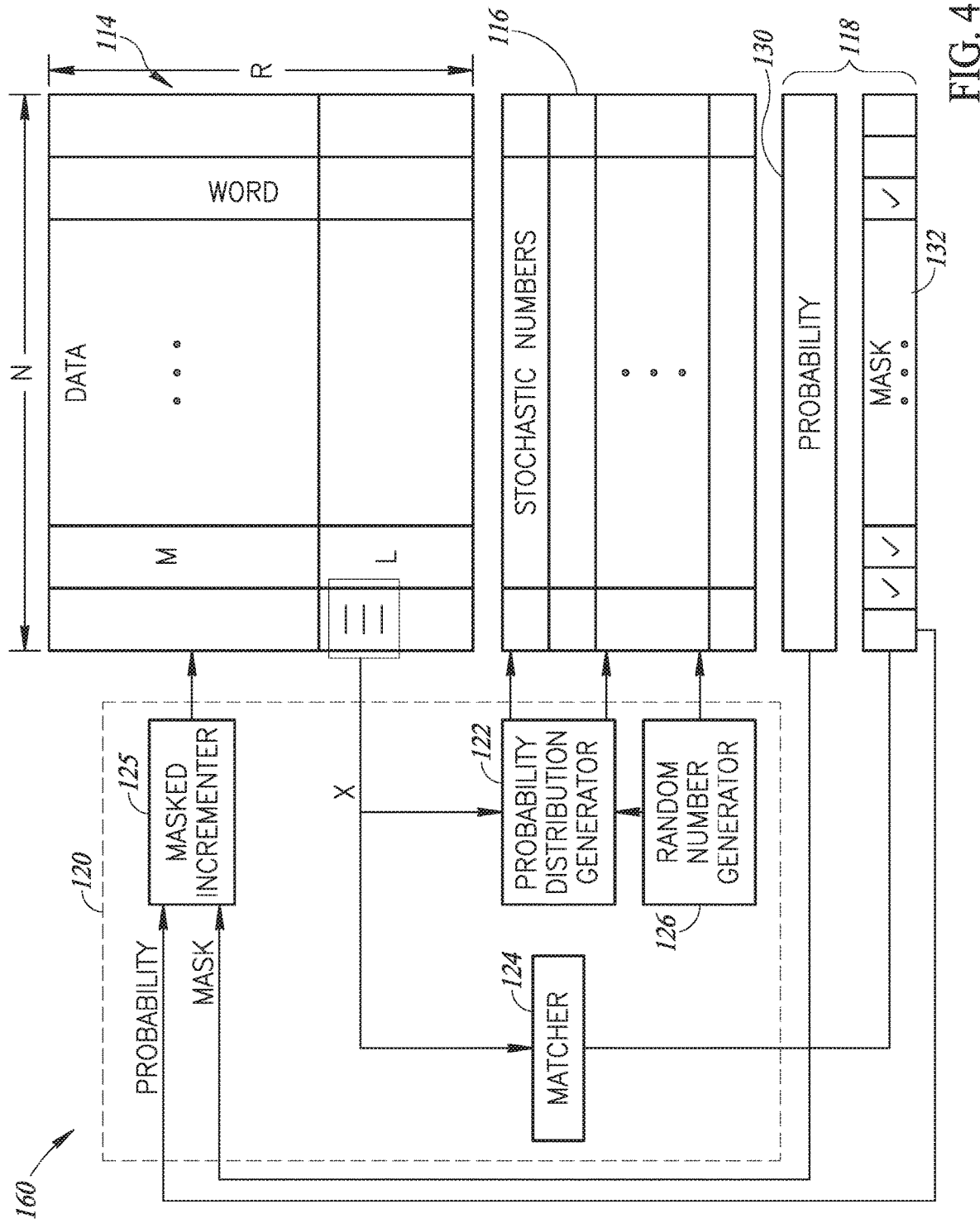
FIG. 4 is a schematic illustration of an associative stochastic rounder, constructed and operative in accordance with a preferred embodiment of the present invention.

Reference is now made to FIG. 4, which illustrates an associative stochastic rounder 100, constructed and operative in accordance with a preferred embodiment of the present invention. Associative stochastic rounder 100 may utilize an associative processor comprising a memory array 110 and a controller 120, operating as described hereinabove with respect to FIG. 3.

Memory array 110 may comprise a plurality of memory cells (volatile or non-volatile), connected in rows and in columns and into which data may be stored and within which data may be operated on. Memory array 110 may be divided into multiple sections, each storing a different type of data. A first section may be a data section 114 which may store the original data to be rounded. A second section may be a stochastic number section 116 to store and operate on stochastic numbers useful in determining probability distributions and a third section may be a calculation section 118. As can be seen in FIG. 4, sections 114, 116 and 118 may be aligned with one another, such that a column in section 114 may extend into a corresponding column of sections 116 and 118. Controller 120 may control the operation of stochastic rounder 100 to generate probabilities and to find matching columns, as described in more detail hereinbelow. To this end, controller 120 may comprise a probability distribution generator 122, which may access a random number generator 126. Controller 120 may also comprise a matcher 124 and a masked incrementer 125.

The original data to be rounded may be R bit words, such as 16 bits or 32 bits or any other number of bits, and may be stored in data section 114, each word in a single column of data section 114. There may be a plurality N of words, where N may be 10K, 20K, 32K or more, depending on the number of columns available. Thus, data section 114 may be at least an R×N array of memory cells.

Stochastic rounder 100 may divide the R bit words into two portions, M and L, where MSB portion M, of length m, may include the most significant bits (MSBs) and LSB portion L, of length l, may include the least significant bits (LSBs). Rounder 100 may utilize LSB portion L, or a subset thereof, to reduce the precision of the R bit words to m bit words. For example, if R is 16, m might be 8, reducing the precision of the 16-bit words in half, to 8-bit words rounded according to the value of the subset of LSB portion L. When rounding a 16-bit word to 8 bits, some of the bits may change or only the 8th bit may change. For example, rounding 999 to 1000 causes all the digits to change while changing 94 to 90 causes only one digit, the last digit, to change.

In accordance with a preferred embodiment of the present invention, not all the least significant bits may be utilized for the rounding operation. Instead, stochastic rounder 100 may utilize only a portion X, of length x, of the least significant bits for the rounding operation. X may be predefined or it may be an input to controller 120. For example, when LSB portion L is of length 8, X might be 4 bits long. Importantly, X includes bits closest to MSB portion M.

Probability distribution generator 122 may determine the probability associated with the digital fraction represented by portion X. To do so, probability distribution generator 122 may first request Y random (or pseudo-random) sequences S of length N from random number generator 126 and may store them in Y rows of stochastic number section 116. For example, Y may be X2=16 and N may be 32K.

In accordance with a preferred embodiment of the present invention, each row of stochastic number section 116 may be a sequence S of independent random variables having a Bernoulli distribution of P=0.5 (i.e. approximately half of the N bits of each row are 1 and half are 0) and each row may be independent of any of the others. For example, when N is 10, one row might store 0011101100 while another row might store 1001101001. Both have five 1's and thus, they both represent a probability distribution of 0.5.

It is noted that, in a sequence of bits xyz which is representative of a decimal fractional value, the bit x represents ½, the bit y represents $(½)2=¼$ and the bit z represents $(½)3=⅛$. Thus, a portion X of a column whose sequence is 0010 represents ⅛. stochastic Probability distribution generator 122 may select a portion X from one of the columns of data section 114 and may determine how to generate a probability $P_{portion}$ equal to the probability represented by the selected portion X from the P=0.5 probabilities of the stochastic rows. Probability distribution generator 122 may select X in any suitable way, such as by generating the 2× possible different bit sequences and working through them or by beginning at the first column and working through the columns with different X values.

To determine the probability $P_{portion}$ which is equal to the probability represented by the current portion X, probability distribution generator 122 may activate multiple rows of stochastic section 116, as required to perform various Boolean operations, such as AND, OR, NAND and NOR, to generate the probability associated with the value of X.

Implementing the various Boolean operations may be performed in accordance with the teachings of U.S. Pat. No. 8,238,173, assigned to the common assignee of the present invention and incorporated herein by reference. U.S. Pat. No. 8,238,173 describes an in-memory processor which activates multiple rows of a memory array at a time, which causes Boolean operations to occur on the activated cells in each column. Some Boolean operations take one cycle; others take more than one cycle, but all can be implemented by activating multiple rows at a time and storing the results in another row, possibly to be utilized in a subsequent multi-row operation. Thus, by activating the relevant rows of stochastic section 116 and by indicating which Boolean function to calculate, probability distribution generator 122 may determine any suitable probability.

For example, if X is ⅛, then probability distribution generator 122 may calculate:

$$P(⅛)=P(½) \text{ AND } P(½) \text{ AND } P(½) \qquad \text{Equation 1}$$

where the AND operator may produce the intersection operation required in the art of calculating probabilities.

To generate the Boolean operation, probability distribution calculator 122 may determine the number of stochastic rows (in Equation 1, 3 rows of stochastic section 116 are needed to generate P=⅛) and may implement the Boolean operation to be performed after activating the determined number of stochastic rows. For example, probability distribution calculator 122 may choose the rows in order from the first one, though other methods of choosing the rows are also possible and are included in the present invention.

For the example in Equation 1, the Boolean operation is an AND for all the operations. All OR operations would produce P=¾ and all NAND operations would produce P(1−⅛)=⅞.

To calculate a probability of 7/16 with stochastic rows each having a probability Pi of ½ requires 5 rows, as follows:

Initially, AND two rows, P1 and P2, and store the result P1-2 in a separate row of stochastic section 116. Do the same with two more rows P3 and P4 as follows:

$$P1 \text{ AND } P2=½*½=¼=P1\text{-}2 \qquad \text{Equation 2}$$

$$P3 \text{ AND } P4=½*½=¼=P3\text{-}4 \qquad \text{Equation 3}$$

Now AND the two result rows P1-2 and P3-4 to generate a third result row P1234, as follows:

$$P1\text{-}2 \text{ AND } P3\text{-}4=¼*¼=1/16=P1234 \qquad \text{Equation 4}$$

Finally, OR a fifth row P5 with the result row P1234, as follows:

$$P5 \text{ OR } P1234=½−1/16=7/16 \qquad \text{Equation 5}$$

Probability distribution calculator 122 may provide the result of the probability calculation, over all N columns, in a probability row 130 of results section 118. Thus, probability row 130 may store the results of the probability calculation using the stochastic rows for all columns of data section 114.

However, not all columns of data section 114 have portion X as part of their least significant portion. Therefore, matcher 124 may perform a comparison operation, comparing the current portion X to the first X bits of the least significant section of each column of data section 114. Matcher 124 may generate a mask having a flag, such as a 1, for each column which matched to portion X and a 0 otherwise, and may store the mask in a mask row 132 of results section 118, where each bit of the mask may be stored in the column to which it relates.

Masked incrementer 125 may receive probability row 130 and mask 132 and may increment the columns in data section 114 which have the portion X (i.e. those indicated by mask 132) by the associated probability bits in probability row 130. This incrementation may be performed in data section 114 with the full adder taught in U.S. Pat. No. 10,534,836, issued on Jan. 14, 2020, assigned to the common assignee of the present invention and incorporated herein by reference, or as described in U.S. Pat. No. 8,238,173.

The output of this operation, per relevant column, may be a rounded value in the relevant column.

In an alternative embodiment, masked incrementer 125 may perform the increment operation in a separate processing section and may rewrite the result back into its column.

In an alternative embodiment, masked incrementer 125 may replace the last bit of M with the results of probability row masked by the data in mask row 132.

In a further alternative embodiment, masked incrementer 125 may store the masked probability rows (i.e. the result of probability row 130 AND mask 132) for each LSB. Since there is no overlap between LSBs, masked incrementer 125 may add all the masked probability rows together and may use the result to increment all the columns in one increment operation.

It will be appreciated that controller 120 may provide a stochastic rounder operative on a large plurality N of words at one time. Moreover, as opposed to the prior art which generated new random numbers for each calculation, controller 120 may generate the Y stochastic rows at one time and may use them for multiple calculations, since, by definition, the Y rows of stochastic section 116 are independent of each other. However, in order to maintain this independence, the Y rows may only be utilized for a predefined number of calculations, such as 2× calculations. At this point, controller 120 may need a new set of stochastic rows.

Figure 5:
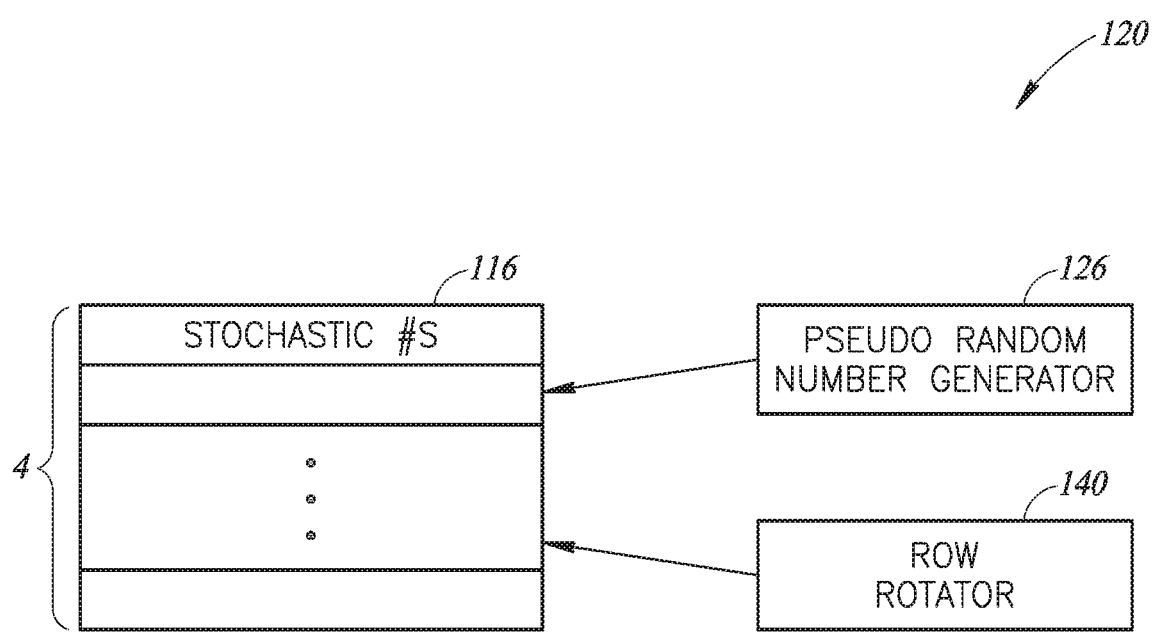
FIG. 5 is a schematic illustration of the operation of a row rotator forming part of the stochastic rounder of FIG. 4.

In accordance with a preferred embodiment of the present invention and as shown in FIG. 5 to which reference is now made, controller 120 may additionally comprise a row rotator 140 to generate the new set of stochastic rows by rotating the existing rows by some amount. This rotation may occur at any time, such as after each row of stochastic section 116 is utilized once, and controller 120 may rotate the rows Y times before instructing stochastic number generator 126 to generate a new set of Y stochastic rows.

Row rotator 140 may also change the stochastic rows by shifting the bits of one or more stochastic rows to different columns within the rows (i.e. the bits remain within their associated row but move to a different column). This may maintain the probability distribution of 0.5 but may change the sequence.

In a further alternative embodiment, controller 120 may define which rows are to be utilized for which probability distribution (i.e. rows 1 and 2 are to be used when X indicates ¼, while rows 3, 4 and 5 are to be used when X indicates ⅛). In this embodiment, row rotator 140 may change which rows to assign for which probability distribution.

It will be appreciated that stochastic rounder 100 may provide in-memory stochastic rounding of a large plurality of words at one time, without having to generate a random bit sequence for each word. Rounder 100 may generate stochastic numbers periodically, such as once every 2× calculations, and each calculation may be operative for a large number of words in parallel. Moreover, the probabilities are calculated with very simple bit line operations on existing stochastic numbers. Boolean operations are performed just by activating the relevant rows (as described in U.S. Pat. No. 8,238,173).

It will be further appreciated that stochastic rounder 100 may perform the following method:

Upon receiving portion X following a last bit of MSB section M of a selected word, rounder 100 may determine a Boolean function of a set of the N bit, stochastic numbers (each having the same probability distribution P) to produce a probability distribution $P_{portion}$ related to portion X. Stochastic rounder 100 may implement the function on the set to produce a resultant stochastic number whose probability distribution is $P_{portion}$. For each word of the N words which has portion X, stochastic rounder 100 may add an associated bit of the resultant stochastic number to MSB section M of the word.

It will be appreciated that all the probabilities (duplicates) $1/2^n, 2/2^n, \ldots, (2^n-1)/2^n$ may be generated from n stochastic numbers using only bit-wise Boolean operations, such as AND, OR and complement operations. For example, 1/16, 2/16, ..., 15/16 can be generated from 4 stochastic numbers because the "span" of 4 independent stochastic numbers that are all equal to ½ contains 1/16, 2/16, ..., 15/16 when using bit-wise Boolean operations.

It will also be appreciated that the present invention also includes utilizing stochastic numbers with probabilities other than ½. For example, the probability of the stochastic numbers stored in stochastic section 116 might be ⅓ or 1/7 or 1/10 or any other suitable base probability. In these embodiments, probability distribution generator 122 may generate the probability distribution $P_{portion}$ as a function of the base probability.

It will further be appreciated that the present invention may provide a method that, given the following:

Y stochastic numbers $S_y$ that are sequences of length N and each having the same probability value;

K probabilities $p_k$, all in the span of the stochastic numbers $S_y$; and

Q markers $m_q$, each indicating one set of numbers that have a certain LSB, can generate a stochastic number $S_{gen}$ of length N such that each sub-sequence $SS_q$, which is defined by $S_{gen}$ marked by $m_q$, is a stochastic number that denotes the $p_k$ associated with each sub-sequence $SS_q$.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for generating probability distributions, the method comprising:
   creating a multiplicity of stochastic numbers, each stochastic number having a same probability distribution P;
   receiving a desired probability distribution $P_{desired}$; and
   determining a Boolean function of a set of said stochastic numbers which produces a probability distribution related to said desired probability distribution $P_{desired}$.

2. The method according to claim 1 and wherein said stochastic numbers have a length N, where N is a number of binary numbers to be rounded.

3. The method according to claim 1 and wherein said same probability distribution P is 0.5.

4. The method according to claim 1 wherein said determining comprises re-using said stochastic numbers for different said functions.

5. The method according to claim 4 and also comprising shifting bits within said stochastic numbers to generate new versions of said stochastic numbers.

6. The method according to claim 4 and also comprising regenerating said multiplicity of said stochastic numbers after performing a predefined number of said determining.

7. A method for stochastic rounding of binary numbers, the method comprising:
   having a multiplicity N of binary words to be rounded, each binary word having a most significant section to be maintained and a least significant section to be removed;
   having a plurality of stochastic numbers of length N, each having a same probability distribution P;
   receiving a portion of at least one of said least significant sections;
   implementing a Boolean function of a set of said stochastic numbers which produces a stochastic number with a probability distribution $P_{portion}$ related to said portion; and
   for each word having said portion, incrementing said most significant number by an associated bit of said resultant stochastic number.

8. The method according to claim 7 wherein said determining comprises generating a multiplicity of said N bit, stochastic numbers using a random number generator and selecting said set from said multiplicity.

9. The method according to claim 8 wherein said determining comprises re-using said multiplicity of said N bit, stochastic numbers for different said functions.

10. The method according to claim 9 and also comprising shifting bits within said N bit, stochastic binary numbers to generate new versions of said N bit, stochastic numbers.

11. The method according to claim 9 and also comprising regenerating said multiplicity of said N bit, stochastic numbers after performing a predefined number of said implementing.

12. The method according to claim 7 wherein said multiplicity N of binary words and said N bit, stochastic numbers are stored in a memory array and wherein said receiving, determining, implementing and adding occur within said memory array.

13. The method according to claim 7 wherein said same probability distribution is ½.

14. The method according to claim 7 wherein N is over 10,000, said portion is less than 5 bits and said multiplicity is $2^5$ or less.

15. The method according to claim 7 wherein said portion is from bits following a last bit of said significant section of a selected word.

16. An associative processor comprising:
a memory array to store a multiplicity of N bit stochastic numbers in separate rows of a stochastic section of said memory array, each stochastic number having a same probability distribution P; and
a controller comprising:
a probability calculator to receive a desired probability distribution $P_{desired}$, to determine a Boolean function of a set of said N bit stochastic numbers which produces said probability distribution $Pd_{esired}$ and to activate associated rows of said stochastic numbers to implement said function on said rows to produce a resultant stochastic number having said probability distribution $P_{desired}$.

17. The processor according to claim 16 and wherein said same probability distribution P is 0.5.

18. The processor according to claim 16 wherein said controller comprises a row rotator to re-use said stochastic numbers for different said functions.

19. The processor according to claim 18 wherein said controller comprises a shifter to shift bits within said stochastic numbers to generate new versions of said stochastic numbers.

20. The processor according to claim 18 wherein said controller also regenerates said multiplicity of said stochastic numbers a predefined number of probability calculations.

21. An associative processor comprising:
a memory array to store a multiplicity N of binary words to be rounded in a data section, each word stored in a different column of said data section, and to store a multiplicity of N bit stochastic numbers in separate rows of a stochastic section of said memory array, wherein columns of said data section and columns of said stochastic section are aligned, each stochastic number having a same probability distribution P, and wherein each binary word has a most significant section to be maintained and a least significant section to be removed;
a controller comprising:
a probability calculator to receive a portion of at least one of said least significant sections, to determine a Boolean function of a set of said stochastic numbers which produces a probability distribution $P_{portion}$ related to said portion and to activate associated rows of said stochastic numbers to implement said function on said rows to produce a resultant stochastic number having said probability distribution $P_{portion}$;
a column matcher to identify columns of said multiplicity of words with said portion; and
an adder to add an associated bit of said resultant stochastic number in said identified column to its associated column.

22. The processor according to claim 21 wherein said controller comprises a random number generator to generate said multiplicity of N bit, stochastic numbers.

23. The processor according to claim 21 wherein said controller comprises a row rotator to rotate said multiplicity of N bit, stochastic numbers into different rows.

24. The processor according to claim 23 and wherein said row rotator comprises a bit shifter to shift bits within said N bit, stochastic numbers to generate new versions of said N bit, stochastic numbers.

25. The processor according to claim 23 said controller to reactivate said random number generator after a predefined number of calculation cycles of said adder.

26. The processor according to claim 21 wherein said same probability distribution is 0.5.

27. The processor according to claim 21 wherein N is over 10,000, said portion is less than 5 bits and said multiplicity is $2^5$ or less.

28. A method for stochastic rounding of binary numbers, the method comprising:
having a multiplicity N of binary words to be rounded, each binary word having a most significant section to be maintained and a least significant section to be removed;
having a plurality of stochastic numbers $S_y$ of length N, each having a probability distribution $P_y$;
having K probabilities $p_k$, all in the span of the stochastic numbers $S_y$;
having Q markers $m_q$, each indicating one set of numbers that have a certain LSB, and
generating a stochastic number $S_{gen}$ of length N such that each sub-sequence $SS_q$, which is defined by stochastic number $S_{gen}$ marked by marker $m_q$, is a stochastic number that denotes a probability $p_k$ associated with each sub-sequence $SS_q$.

* * * * *